United States Patent [19]

Gago et al.

[11] Patent Number: 4,703,713
[45] Date of Patent: Nov. 3, 1987

[54] COATING DEVICE

[75] Inventors: Ignace Gago, Braine-l'Alleud; Emile Berwart, Liernu, both of Belgium

[73] Assignee: Solvay & Cie (Societe Anonyme), Brussels, Belgium

[21] Appl. No.: 862,242

[22] Filed: May 12, 1986

[30] Foreign Application Priority Data

May 15, 1985 [FR] France ............................ 85 07528

[51] Int. Cl.$^4$ ........................................... B05C 11/02
[52] U.S. Cl. ................................. 118/19; 118/3.3; 118/418
[58] Field of Search ................... 118/19, 303, 418, 53; 366/219; 51/164.2

[56] References Cited

U.S. PATENT DOCUMENTS 2,485,302 10/1949 Lukas.
2,502,809 4/1950 Vogelsang.
2,579,734 12/1951 Burgesser.
2,937,814 5/1960 Joisel .............................. 51/164.2 X
3,013,365 12/1961 Harper ............................ 118/418 X
3,394,677 7/1968 Taylor et al. .................... 118/19 X
3,524,735 8/1970 Oetiker ............................ 51/164.2

FOREIGN PATENT DOCUMENTS 1226867 10/1966 Fed. Rep. of Germany.
450429 1/1913 France.

OTHER PUBLICATIONS

Annalesde Gembloux, "L'Envobage Des Semencas: Perspectives Actuelles et Futures", 1982, pp. 165-175.

Primary Examiner—John P. McIntosh
Attorney, Agent, or Firm—Spencer & Frank

[57] ABSTRACT

Coating device whose coating vessel is driven simultaneously with a rotary motion on itself around an axis of rotation and with a planetary motion around this axis of rotation. The device makes it possible to coat various products, especially kernels, seed, fruit, confectionery products, dragées, sweets, pharmaceutical products, and the like.

8 Claims, 1 Drawing Figure

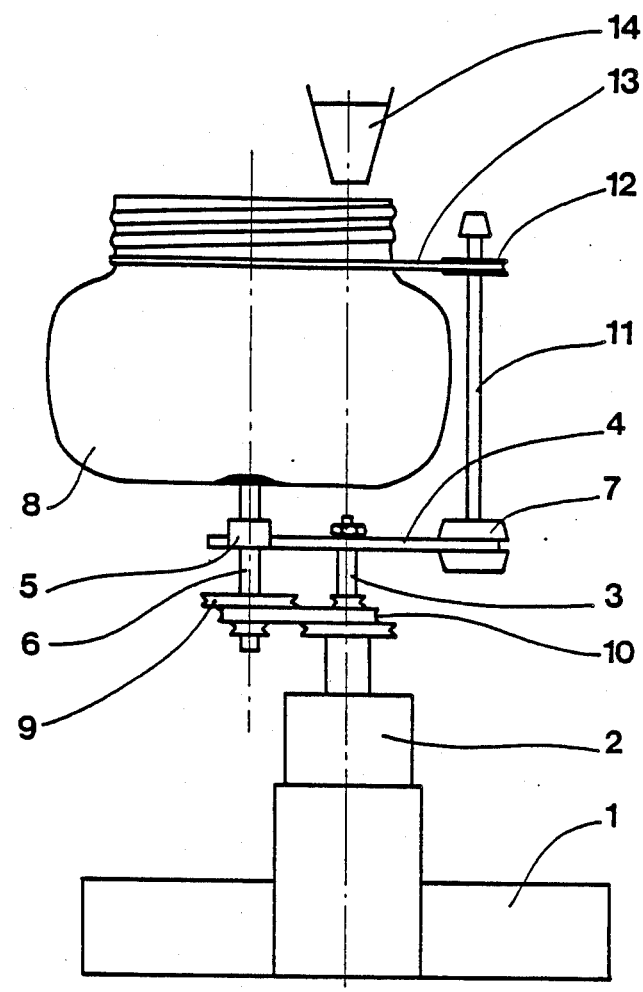

COATING DEVICE

The present invention relates to a coating device which is particularly suitable for depositing one or more uniform coats of coating substances on products such as seeds.

In U.S. Pat. Nos. 2,502,809 and 2,579,734 it has been proposed to use, as a coating device, a vessel of generally spherical shape, into which the products to be coated and the coating substances are introduced, the vessel being driven in a rotary motion around its axis, which may be inclined, if appropriate, so as to produce an intimate mixture of its contents.

Furthermore, it is known from the literature (Annales de Gembloux, 1982, 88, 170-171), to introduce the coating substances which are in the form of powders, uniformly into the coating vessel during its rotation and to spray, using a gun, a binder or an adhesive which bonds the powder(s) to the products to be coated.

However, these methods have disadvantages. Thus, if the rate of rotation of the vessel is greatly increased, in order to endow the coating with good strength, it is found that the products to be coated tend, as a result of the centrifugal force, to be applied against the wall of the vessel and to rotate with the latter instead of rolling over each other; that is to say merely to climb the walls of the vessel in order to fall back while rolling over each other. This phenomenon, which makes the coating defective, has been confirmed especially in the case of products which are to be coated which are small in size or light in weight.

To avoid this disadvantage, some manufacturers recommend knives, scrapers or buffers of various shapes to be inserted in the vessel in order to prevent the products to be coated from turning with the vessel. However, these means entail the disadvantage of causing violent impacts and of increasing the risks of detachment of the coating and of breaking up of the products to be coated.

Furthermore, the coating substances, the binder and the adhesive form deposits on the knives, scrapers or buffers as the operation progresses. This results in a fairly considerable loss of raw materials which cannot be recovered and can also unfavourably modify the relative percentages of the coating substances, the products to be coated and the binder.

In addition, it is found with the known coating devices that products which are to be coated and which are irregular, nonspherical, elongated, starlike, flat or ellipsoidal in shape are difficult to rotate and instead tend to slip over each other, which makes a uniform coating impossible.

Lastly, in the usual coating techniques, the coated products must pass through sieves in order to yield finished products of the required particle size, the rogue products or those of excessively small or excessively large particle size being removed, and this results in losses of materials.

The subject of the present invention is a coating device which enables these disadvantages to be overcome.

To this end, the present invention relates to a coating device comprising at least one coating vessel, intended to receive the products to be coated and the coating substances, and driving means imparting to it a rotary motion on itself, around an axis of rotation, the said coating device being characterized in that the driving means additionally impart to the vessel a simultaneous planetary rotary motion around this axis of rotation.

The coating vessel may be of various shapes. Vessels of a spherical, cylindrical, ellipsoidal or flattened spherical shape are usually employed. The coating vessel preferably has a flat bottom and a side wall which are joined to each other by a fillet radius in order to make it easier to set the products to be coated in rotation.

The nature of the materials used to construct the coating vessels is not critical in itself and depends essentially on their use. Thus, coating vessels may be made of a metal such as stainless steel, of plastic or any other suitable material. In addition, the inner wall of the vessel may have been subjected to various treatments such as, in particular, a nonstick treatment such as, for example, a coating with polymers such as polyvinylidene fluoride. Preferably the interior of the vessel should have only rounded corners.

Lastly, the coating vessel may be fixed or dismountable but is preferably dismountable.

Vessel capacity as such is not critical and depends essentially on the quantity of products to be coated and on the quantity of coating substances to be applied.

The axis of rotation of the coating vessel may be tilted at an angle ranging from 0° to 180° to the vertical, for example by tilting the entire apparatus, and this permits the bulk of the products to be coated to be properly distributed in the coating vessel, that is to say to increase the receptive area of the products to be coated and to promote the rotation of the latter about themselves. The slope to be given to the axis is, in particular, a function of the size and of the shape of the products to be coated; a slope greater than 90° enables the vessel to be emptied.

The coating device according to the invention comprises driving means such as a motor, preferably with variable speed, imparting to the coating vessel a planetary rotary motion around an axis parallel to this axis of rotation, this planetary rotation preventing the products to be coated from remaining on the wall against which they are applied by the centrifugal force which is imparted by the rotary motion of the coating vessel on itself. In this manner, the products to be coated no longer tend to rotate with the coating vessel.

The coating device according to the invention comprises driving means which also impart to the coating vessel a simultaneous rotary motion on itself in order to cause the products to be coated to roll over each other and to mix the products to be coated with the coating substances in a homogeneous manner.

The rates of rotation which are imparted by the driving means are adjustable; they depend on the coating device, the coating vessel and the products to be coated.

The driving means which provide the planetary rotary motion may be independent of those providing the rotary motion of the vessel around this axis of rotation and may, for example, consist of independent, variable-speed motors. According to an advantageous embodiment, these means may consist of a set of pulleys or gears driven by the motor responsible for rotating the vessel on its axis. In this case, a judicious choice of the diameters of the pulleys or of the gears determines the ratio of the speeds of the rotary motions and in accordance with the arrangement of the belt, the relative diameters of the pulleys, or the number and the diameter of the gears employed. The driving means may impart rotary motions to the coating vessel in the same direction or in the direction opposite to the direction of the planetary rotary motion.

A coating device according to the present invention is, furthermore, explained in further detail in a practical embodiment which will be described and, to describe which, reference will be made to the Figure in the attached drawing.

The sole FIGURE is an elevational view of a preferred embodiment of the device according to the invention.

Thus, as seen in the FIGURE, the coating device comprises an inclinable fixed carrier frame 1, a rotary motor 2, mounted on this carrier frame 1, and forming the means for driving the coating device.

The end of the rotary shift 3 of the rotary motor 2 is equipped with a T-shaped carrier arm 4; one end of this carrier arm 4 is provided with a bearing housing 5 in which a shaft 6 parallel to the rotary axis 3 of the rotary motor 2 can turn freely; the other end of the carrier arm 4 is provided with a balancing counterweight 7.

A coating vessel 8 is fixed by means of the central part of its bottom to the end of the shaft 6.

The device for driving the shaft 6 rotationally consists of a set of cone-pulleys 9 fixed on this shaft 6 in a mechanical relationship with a second set of fixed cone-pulleys 10 mounted on the fixed carrier frame 1.

The end of the carrier arm 4 away from the bearing box 5 is equipped with a carrier 11 parallel to the rotary shaft 3 of the motor 2. This carrier 11, which extends as far as the upper part of the coating vessel 8, is equipped at its end with an idler pulley 12 which retains a belt 13 for retaining the overhang of the coating vessel 8, which belt is engaged around the upper part of the coating vessel.

The coating device according to the invention may be advantageously fitted with a variable-speed motor such as a rotary motor whose rate of rotation may be regulated between 25 and 250 revolutions per minute.

The device for turning the shaft 6 drives the latter at an apparent rate of rotation which can generally vary from 0 to 500 revolutions per minute. This apparent rate depends on the rate of rotation imposed by the variable speed motor, on the diameter $D_2$ of the movable pulley 9 and on the diameter $D_1$ of the fixed pulley 10. The apparent rate of rotation is defined as the number of revolutions of the coating vessel on itself, which an external observer counts over a given time period. In the case where the diameters of the pulleys 9 and 10 are not extremely different, the apparent rate of rotation of the vessel can be calculated from the formula :

$$\frac{D_2 - D_1}{D_2} \times \text{the speed of rotation due to the planetary motion.}$$

In a preferred embodiment of the coating device, according to the invention, the eccentric distance between the axis of the rotary shaft 3 and the axis of the shaft 6 which carries the coating vessel is less than the inner radius of the opening of the coating vessel, and this makes it possible to place above the coating vessel a fixed device 14 for feeding the coating vessel, arranged on the axis of the rotary shaft 3. This fixed feeding device enables coating substances to be easily introduced during the operation without stopping the rotary motions and/or a binder or an adhesive to be injected by a fixed device.

In another embodiment of the coating device according to the invention, the eccentric distance between the axis of the rotary shaft 3 and the axis of the shaft 6 which carries the coating vessel is greater than the outer radius of the coating vessel. This embodiment enables the device to be equipped with a plurality of coating vessels which operate simultaneously. Thus, for example, it then becomes possible to replace the balancing counter weight 7 by a vessel identical to the vessel 8, that is to say placed symmetrically to the first coating vessel relative to the axis of the rotary shaft 3.

The coating device according to the invention makes it possible to coat various products such as kernels, seed, seeds, fruit, confectionery products, dragées, almonds, pills, sweets, pharmaceutical products, and the like.

Practical illustrations are described hereinafter.

This coating device according to the invention also makes it possible to coat seed with materials such as nutrient substances, fillers, fungicides, herbicides, insecticides, and the like, the seed coating being intended to improve the germination characteristics, to provide various additives capable of playing a part at any time during the establishment and the growth of the plants, to protect the seed, or to endow the seed with a shape or a size which is highly suitable for automated sowing. A concrete example is to be found in French patent application No. 83/19,983 in the name of Solvay & Cie.

Practical implementations of the coating device according to the invention make it possible to coat fruit with sugars, syrups, chocolate, cocoa, colorants, confectionary additives, lecithin, flavouring products, milk powder, natural or synthetic vanilla, a preserving additive, and the like, or, in general to coat any confectionery product in order to produce dragées, sweets of an appropriate size and/or consisting of successive layers of different products arranged around a central core.

Similarly, the coating device according to the invention may be used in the pharmaceutical industry in order to produce galenic dragées, multilayer pills, or any pharmaceutical or veterinary product or medication.

The coating device according to the invention permits, in particular, a highly satisfactory coating of products to be coated which are small in size, light in weight, or else of various nonuniform shapes. The device is gentle and continuous in its motions, and this prevents any impact and eliminates the danger of breakage of the coating or of the product to be coated. Losses of material are avoided to the greatest degree possible and the coated products are properly sized. The coated products obtained with the device according to the invention are uniformly spherical in shape, whatever their initial shape.

The coating device according to the invention makes it possible to obtain an excellent coating which stands up well to attrition, friction, impacts and abrasion. This resistance, which is imparted by the combination of parameters such as the type of products to be coated, the coating substances, the binder or the adhesive employed, is also contributed by the centrifugal force applied to the contents of the coating vessel. Thus, the greater the centrifugal force, that is to say the higher the rate of rotation of the vessel, the more compact is the coating and the greater is its attrition resistance. In the coating device according to the invention, high rates may be applied without any problem, because the products to be coated are not retained on the wall of the vessel, since they are also subject to the force resulting from the planetary motion which releases them from this wall and makes them fall while rolling over one another.

The following examples illustrate the invention.

EXAMPLE 1

A coating device such as illustrated in the FIGURE is equipped with a vessel of a capacity of 25 l, with a flat bottom and a side wall which are joined together by a fillet radius.

The vessel is made of stainless steel and has the following characteristics:
a diameter of 370 mm,
a total height of 285 mm.

The diameter $D_2$ of the movable pulley 9 is 52 mm, that $D_1$ of the fixed pulley 10 is 57 mm.

The eccentric distance between the shaft carrying the coating vessel and the axis of the rotary shaft is 110 mm; it is shorter than the radius of the coating vessel.

200 g of single-bud beet seed are freed from dust, and then moistened with an aqueous solution (50% of the solution composition A described hereinafter) at a rate of 12 ml of solution per 100 g of seed.

The wet seed is then introduced into the stationary coating vessel.

The whole coating device is then tilted at an angle of 40° to the vertical.

The rate of rotation of the planetary motion is set at 100 revolutions per minute. The apparent rate of rotation of the coating vessel on itself is 10 revolutions per minute.

The direction of the rotary motions are opposite.

While the vessel is rotating, 900 g of inorganic fillers comprising ground beat, bentonite, kaolin and limestone are introduced successively three times by sprinkling via the fixed feeding device. Alternating with this, a total of 880 ml of an aqueous solution of adhesive agent (composition A containing 42 g of polyvinylpyrrolidone, 126 g of sugar and 1832 g of demineralized water) are sprayed in.

48 g of a colouring agent (90% of talc and 10% of ferric oxide) are then added.

These operations take approximately 3 hours.

The seed is then dried in the oven at 35° C. for 16 hours.

The seed thus obtained is ready for use. Its particle size is uniform and needs no classifying; 34% of the coated seeds have a diameter of between 4 and 4.75 mm, and 66% of between 3.4 and 4 mm.

No significant loss has been found in the material balance, in particular no seed has been broken during the coating.

The germination tests carried out subsequently at 20°–22° C. on filter paper and on wet sand have produced excellent results: 98% of the seed has germinated.

EXAMPLE 2

Example 1 is repeated but with a coating vessel with a capacity of 10 l.

This coating vessel is in the shape of an ellipsoid with a major axis of 270 mm and a minor axis of 160 mm. This coating vessel is made of plastic.

The diameters of the pulleys and the eccentric distance between the shaft carrying the coating vessel and the axis of the rotary shaft are identical to those in Example 1.

The whole coating device is tilted at an angle of 45° to the vertical.

5 g of lettuce seed are freed from dust and are then moistened with an aqueous solution (50% of the solution composition A) at a rate of 12 ml of solution per 100 g of seed.

The rate of rotation of the planetary motion is set at 90 revolutions per minute and the apparent rate of rotation of the coating vessel on itself is 9 revolutions per minute.

The directions of the rotary motions are opposite.

The wet seed is then introduced into the stationay coating vessel.

While the vessel is rotating, 28 g of inorganic charges comprising kieselguhr, kaolin and silica are added by means of the fixed feed device. The adhesive agent (14 ml), whose composition is identical to that in Example 1, is sprayed continuously during the coating.

2 g of kaolin are then added to smooth the coating.

These operations require approximately 2 hours.

After coating, the seed is rapidly dried at ambient temperature using air impelled by a fan.

The coated seed is then left to germinate in moist earth. The germination tests were carried out at approximately 20° C., and these tests have given excellent results (100% germination).

In all cases the coating material adheres very well to the seed and is not detached during packaging and the use of the seeds, that is to say without embrittlement or disintegration of the coating.

The coated lettuce seed which is obtained is uniform in size.

EXAMPLES 3 and 4

Example 2 is repeated, but endive and tomato seeds are coated instead of lettuce seeds.

The germination tests have given excellent results (90 to 100% germination).

The coated seeds obtained are uniform in size and are properly spherical, and this makes sowing easier.

We claim:

1. Coating device comprising at least one coating vessel intended to receive the products to be coated and the coating substances, and driving means imparting to the vessel a rotary motion on itself about an axis of rotation, characterized in that: the driving means also impart to the vessel a simultaneous planetary rotary motion around an axis parallel to this axis of rotation; said device further comprises a fixed carrier frame (1), a rotary motor (2) mounted on this carrier frame (1) in which the end of the rotary shaft (3) is equipped with a T-shaped carrier arm (4), one end of this carrier arm (4) being provided with a bearing casing (5) in which a shaft (6) which is parallel to the rotary shaft (3) of the motor (2) can turn freely and whose other end is provided with a balancing counterweight (7), a coating vessel (8) fixed by means of the central part of its bottom to the end of the shaft (6) and a device for rotating the shaft (6) such as a set of cone-pulleys (9) fixed to this shaft (6) in a mechanical relationship with a second set of fixed cone-pulleys (10) mounted on the fixed carrier frame (1); and the end of the carrier arm (4) away from the bearing casing (5) is equipped with a carrier (11) parallel to the rotary shaft (3) of the motor (2) and extending to the upper part of the coating vessel (8), the said shaft being provided at its end with an idle pulley (12) supporting a belt (13) for retaining the overhang of the coating vessel (8) which is engaged around the upper part of the coating vessel (8).

2. Coating device according to claim 1, characterized in that the driving means impart to the vessel a rotary motion on itself in the same direction as that of the planetary rotary motion.

3. Coating device according to claim 1, characterized in that the driving means impart to the vessel a rotary motion around itself in the direction opposite to the direction of the planetary rotary motion.

4. Coating device according to claim 1, characterized in that the axis of rotation of the coating vessel may be tilted at an angle varying from 0° to 180° to the vertical.

5. Coating device according to claim 1, characterized in that the coating vessel comprises a flat bottom and a side wall which are joined together by a fillet radius.

6. Device according to claim 1, characterized in that the rotary motor (2) is a variable-speed motor whose rate of rotation can be regulated between 25 and 250 revolutions per minute.

7. Device according to any one of claim 1, characterized in that the device for rotating the shaft (6) drives the latter at an apparent rate of rotation which can vary from 0 to 500 revolutions per minute.

8. Device according to claim 1, characterized in that the eccentric distance between the axis of the rotary shaft (3) and the axis of the shaft (6) supporting the coating vessel is shorter than the inner radius of the opening of the coating vessel and that it comprises a fixed device (14) for feeding the coating vessel, arranged on the axis of the rotary shaft (3).

* * * * *